US009322660B2

(12) United States Patent
Mund

(10) Patent No.: US 9,322,660 B2
(45) Date of Patent: Apr. 26, 2016

(54) INCREMENTAL MAP GENERATION, REFINEMENT AND EXTENSION WITH GPS TRACES

(75) Inventor: Heiko Mund, Hildesheim (DE)

(73) Assignee: TomTom Germany GmbH & Co. KG, Harsum (DE)

( * ) Notice: Subject to any disclaimer, the term of this patent is extended or adjusted under 35 U.S.C. 154(b) by 0 days.

(21) Appl. No.: 13/503,429

(22) PCT Filed: Oct. 22, 2009

(86) PCT No.: PCT/EP2009/063938
§ 371 (c)(1), (2), (4) Date: Jul. 16, 2012

(87) PCT Pub. No.: WO2011/047729
PCT Pub. Date: Apr. 28, 2011

(65) Prior Publication Data
US 2012/0277993 A1 Nov. 1, 2012

(51) Int. Cl.
*G01C 21/32* (2006.01)
*G09B 29/10* (2006.01)

(52) U.S. Cl.
CPC .............. *G01C 21/32* (2013.01); *G09B 29/106* (2013.01)

(58) Field of Classification Search
CPC .............................. G01C 21/32; G09B 29/106
USPC .............. 701/446–450, 532, 533; 340/995.14
See application file for complete search history.

(56) References Cited

U.S. PATENT DOCUMENTS 4,796,191 A * 1/1989 Honey et al. .................. 701/445
5,023,798 A * 6/1991 Neukirchner et al. ........ 701/446
5,383,127 A * 1/1995 Shibata ......................... 701/446
5,512,904 A * 4/1996 Bennett ......................... 701/472
6,385,539 B1 5/2002 Wilson et al.
6,516,267 B1 2/2003 Cherveny et al.
6,853,913 B2 * 2/2005 Cherveny et al. ............. 701/532
6,931,322 B2 * 8/2005 Jung et al. ...................... 701/446
7,451,040 B2 * 11/2008 Miyahara ...................... 701/426
7,859,536 B2 12/2010 Poppen (Continued)

FOREIGN PATENT DOCUMENTS

EP 0921509 A2 6/1999
EP 1492072 A1 12/2004
JP H11249552 A 9/1999
JP 2008059081 A 3/2008

OTHER PUBLICATIONS

Rogers, Seth; Langley, Pat; and Wilson, Christopher: "Mining GPS Date to Augment Road Models", KDD '99 Proceedings of the fifth ACM SIGKDD international conference on Knowledge discovery and data mining pp. 104-113.*

(Continued)

*Primary Examiner* — Helal A Algahaim
*Assistant Examiner* — Donald J Wallace

(57) ABSTRACT

A method for improving and extending an existing road network and generating new networks from statistically relevant amounts of probe data recorded by GPS-enabled navigation devices. New probe data is matched to the existing digital vector map, then the data merged into the existing network using a weighted mean technique. When new roads are detected, appropriate junction points are made with the existing network elements. The updated network data is simplified to improve computing speed and reduce data storage requirements.

15 Claims, 7 Drawing Sheets

N1 N2 N3 N4 N5 N6 N7 N8 30 Generated Network 36 s P1 P2 P3 P4 P5 32 P6 Trace Line P7 P8

(Preexisting) Generated Network Element
Trace Line (from Probe Data)
New Centre Line (Merged Probe Data)
Split Network Element (via New Junction "s")
New Branch Line
Offsets

(56) References Cited

U.S. PATENT DOCUMENTS

| | | | | |
|---|---|---|---|---|
| 7,986,831 | B2 | 7/2011 | Nielsen | |
| 8,355,864 | B2 * | 1/2013 | Kida et al. | 701/446 |
| 8,386,171 | B2 * | 2/2013 | Park | 701/447 |
| 8,762,046 | B2 * | 6/2014 | Dorum et al. | 340/995.14 |
| 2007/0024624 | A1 * | 2/2007 | Poppen | 345/441 |
| 2007/0129892 | A1 | 6/2007 | Smartt et al. | |
| 2009/0070035 | A1 * | 3/2009 | Van Buer | 701/210 |
| 2009/0177382 | A1 | 7/2009 | Alles et al. | |

OTHER PUBLICATIONS

Schroedl, Stefan; Wagstaff, Kiri; Rogers, Seth; Langley, Pat; and Wilson, Christopher: "Mining GPS Traces for Map Refinement", Data Mining and Knowledge Discovery, Jul. 2004, vol. 9, Issue 1, pp. 59-87.*

International Search report issued Aug. 2, 2010 for International Application No. PCT/EP2009/063937.

International Search report issued Jul. 20, 2010 for International Application No. PCT/EP2009/063938.

Wenk C et al: "Addressing the Need for Map-Matching Speed: Localizing Global Curve-Matching Algorithms" Scientific and Statistical Database Management, 2006. 18th International A Conference on Vienna, Austria Jul. 3-5, 2006, Piscataway, NJ USA, IEEE LNKD-DOI:10.1109/SSDBM.2006.11 Jul. 3, 2006, pp. 379-388, XP010927108 ISBN: 978-0-7695-2590-7 p. 380-p. 381.

Brakatsoulas: "On Map-Matching Vehicle tracking data" Proceedings of the 31st VLDB Conference, Dec. 31, 2005, pp. 853-864, XP040026470 ACM, 2 Penn Plaza, Suite 701—New York, USA the whole document.

* cited by examiner

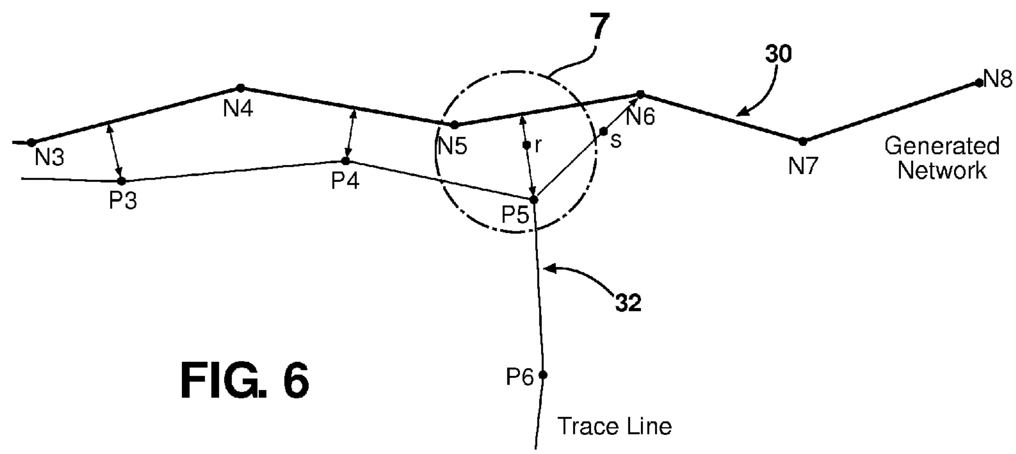
FIG. 6
FIG. 7
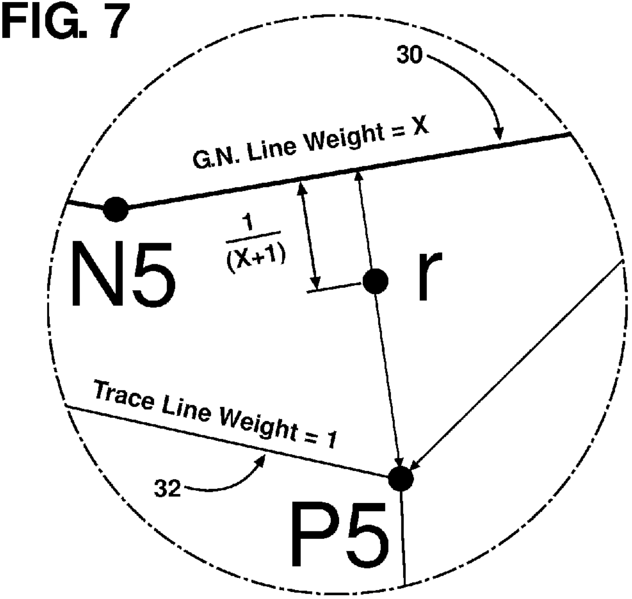

INCREMENTAL MAP GENERATION, REFINEMENT AND EXTENSION WITH GPS TRACES

CROSS CROSS-REFERENCES TO RELATED APPLICATIONS

This application is the National Stage of International Application No. PCT/EP2009/063938, filed Oct. 22, 2009 and designating the United States. The entire content of this application is incorporated herein by reference.

BACKGROUND OF THE INVENTION

1. Field of the Invention

This invention relates generally to a method for updating and extending digital vector maps using probe data, and more particularly toward a method for improving digital roadway and pathway maps using GPS coordinates generated by one or more personal navigation devices.

2. Related Art

Navigation systems, electronic maps (also known as digital maps), and geographical positioning devices are increasingly used by travelers to assist with various navigation functions, such as to determine the overall position and orientation of the traveler and/or vehicle, find destinations and addresses, calculate optimal routes, and provide real-time driving guidance. Typically, the navigation system includes a small display screen or graphic user interface that portrays a network of streets as a series of line segments, including a centre-line running approximately along the centre of each street or path. The traveler can then be generally located on the digital map close to or with regard to that centre-line.

Digital maps are expensive to produce and update, since exhibiting and processing road information is very costly. Surveying methods or digitizing satellite images are commonly employed techniques for creating a digital map. Furthermore, digital maps are likely to contain inaccuracies or systematic errors due to faulty or inaccurate input sources or flawed inference procedures. Once a digital map has been created, it is costly to keep map information up to date, since road geometry changes over time. In some regions of the world, digital maps are not available at all.

FIGS. 1A-1C depict a digital vector map in the form of roads. FIG. 1A represents major motorways or driving routes. FIG. 1B depicts the major motorways of FIG. 1A plus an interconnecting network of secondary roads. FIG. 1C illustrates all of the information of FIG. 1B together with an extended network of tertiary streets and alleys. As will be appreciated by reference to these figures, in combination with the expense and effort required to produce digital maps, it may be the case that an existing roadway map or network is incomplete in its depiction of all roadways or paths within a given region. Furthermore, due to the evolving nature of networks which may include but are not limited to roadways and paths, changes may occur over time such that an existing digital map may no longer accurately portray current conditions.

In FIG. 2, a digital vector map contains junctions J and line segments $w_1 \ldots w_9$. Together, they constitute a graph with several additional properties. The junctions J are the nodes and the line segments w are the edges of the graph. For a unidirectional map the graph is directed and for a bidirectional map it is undirected. Every line segment w connects two junctions J. On the contrary, in each junction J meets just one or least three line segments w. (Only in exceptional cases will two line segments meet in a junction.) The junctions J and the line segments w are usually associated with several attributes, including for example weight value, measure and heading. The geometry of a line segment w is often described as a polygonal chain (also called polygonal curve, polygonal path, or piecewise linear curve). Alternatively one can also use other curves like splines, circle segments or clothoids. However because each curve can be sufficiently accurately approximated through a polygonal chain, usually polygonal chains are used. The vertices or nodes of a polygonal chain are called shape points SP because they define the shape of the curve. Of course, it is possible to change a shape point SP to a junction J under appropriate circumstances, for example if an attribute changes.

FIG. 2 illustrates a fractional section of a digital vector map, in this case a bi-directional roadway supporting two-way traffic. A main trunk of the roadway is indicated at 10 and a branch road extending generally perpendicularly from the main trunk 10 is indicated at 12. It is known, for example, to take probe data inputs from low-cost positioning systems and handheld devices and mobile phones with integrated GPS functionality for the purpose of incrementally learning a map using certain clustering technologies. The input to be processed consists of recorded GPS traces in the form of a standard ASCII stream, which is supported by almost all existing GPS devices. The output is a road map in the form of a directed graph with nodes and edges annotated with travel time information. Travelers appropriately fitted with navigation devices and traversing the main trunk 10 and branch 12 junction may thus create a trace map like that shown in FIG. 4, with nodes created at regular distances. The nodes and edges are stored in a digital vector map table or database. Through this technique which represents an incremental approach, road geometry can be inferred, and the collected data points refined by filtering and partitioning algorithms. For more complete discussion on this technique, reference is made to "Incremental Map Generaltion with GPS Traces," , Briintrup, R., Edelkamp, S., Jabbar, S., Scholz, B., Proc. 8th Int. IEEE Conf. on Intelligent Transportation Systems, Vienna, Austria, 2005, Pages 413-418.

Another technique developed by H.-U. Otto and O. Schmelzle of Tele Atlas B. V., based on a local approach, generates a new road network from probe data. This approach is based on the technique of following each trace and looking into the buffer around separate trace points to establish the line segments. New network elements, e.g., roadways or pathways, are generated depending on the distribution of the data points inside the buffer and the associated directions of vectors. While this technique is useful in generating new maps using GPS traces or other probe data, it is not well suited to improving existing networks.

Accordingly, there is a need for an improved method to receive probe data such as that from GPS-enabled navigation devices, for the purpose of improving existing networks and generating new network elements such as employed in the practice of digital map making.

SUMMARY OF THE INVENTION

This invention overcomes the shortcomings and deficiencies of the various prior art techniques by providing a method for generating, refining and extending digital vector maps using any type of traces, but most preferably GPS traces, from probe data. The method comprises the steps of: providing a digital vector map configured to store a plurality of line segments spatially associated within a coordinate system; associating each line segment in the digital vector map with a weight value; collecting at least one GPS trace from a plurality of sequentially transmitted probe data points; establishing a map matching criteria; and comparing each probe data point along the GPS trace to the line segments in the digital vector map using the map matching criteria. The method is characterized by: designating as "matched" to at least one line segment each probe data point along the GPS trace that meets the map matching criteria while designating as "unmatched" each probe data point along the GPS trace that fails the map matching criteria; associating the portion of the GPS trace containing matched probe data points to the respective line segments (if any) of the digital vector map; computing a centre-line between the respective line segment and any portion of the GPS trace containing corresponding matched probe data points using the weight value of the line segment; replacing the line segment through the centre-line; and creating a new line segment in the digital vector map with the portion of the GPS trace containing unmatched probe data points.

The map matching criteria can be established in a variety of suitable ways. According to one method, an offset distance is calculated between each probe data point and a line segment in the digital vector map. A predetermined maximum offset value is also established, and probe data points which have a calculated offset distance smaller than the maximum offset value are designated as matched probe data points. Conversely, probe data points which have a calculated offset distance larger than the maximum offset value are designated as unmatched probe data points.

By this method, an already existing digital vector map, such as that used for road maps, bicycle maps and footpath maps and the like, can be improved using collected probe data. The improved quality of the digital vector map can be used to more accurately detect branches, merges and crossings in the digital vector map, may be used to generate both unidirectional and bidirectional networks, and represents a substantial efficiency improvement when computing large amounts of probe data over a large network area. Furthermore, the general concepts of this invention can be used to improve any digital vector map, not only roadway and pathway maps. For example, circuit diagrams, schematics, and other graphical representations that can be spatially associated within a coordinate system may benefit from the techniques of this invention.

BRIEF DESCRIPTION OF THE DRAWINGS

FIGS. 1A-C depict a roadway network as representative of one form of digital vector map wherein FIG. 1A shows the major roadways, FIG. 1B shows the interconnecting network and FIG. 1C depicts a street network;

FIG. 6 is an enlarged view from FIG. 5 depicting the optional split points from which new junctions may be inserted to a digital vector map;

FIG. 7 is an enlarged view of the area circumscribed at 7 in FIG. 6 and related to the step of computing a new junction in order to split a line segment.

DETAILED DESCRIPTION OF THE PREFERRED EMBODIMENT

Figure 1C:
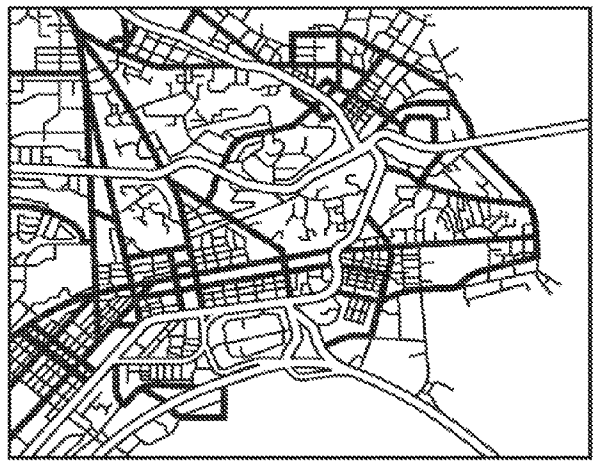
Figure 1B:
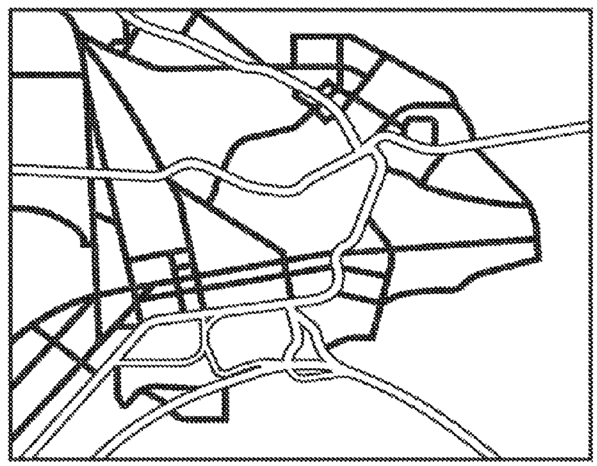
Figure 1A:
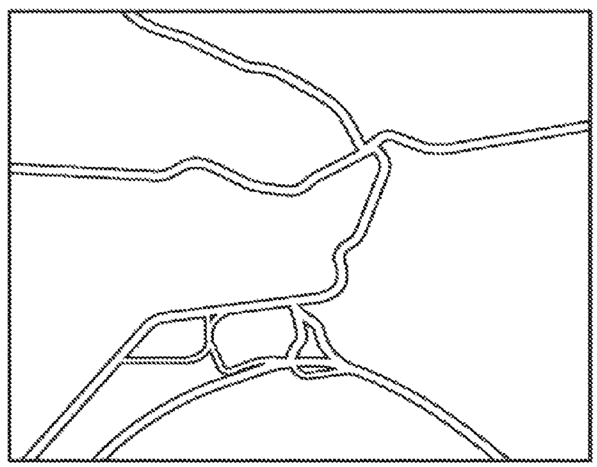
Figure 2:
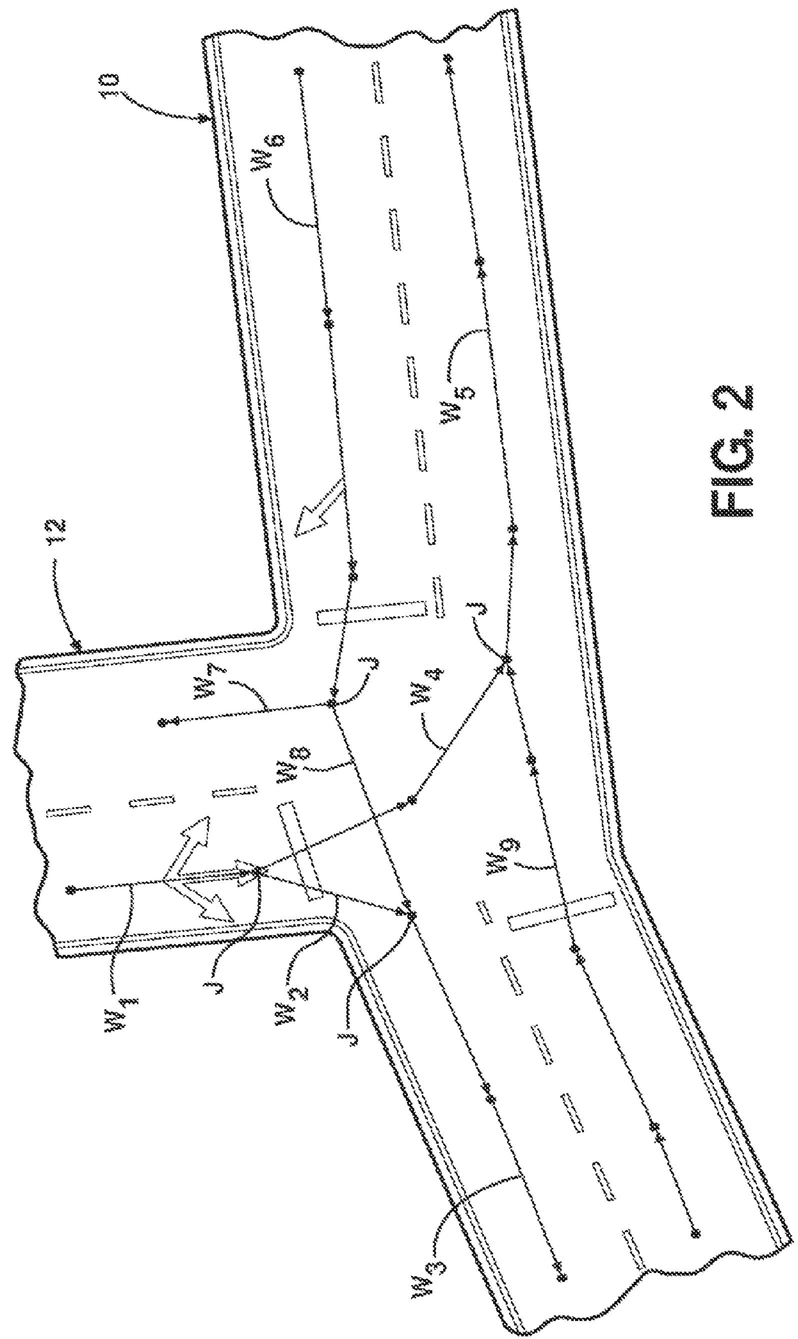
FIG. 2 is simplified depiction of a digital vector map showing its junctions, line segments, and shape points.
Figure 3:
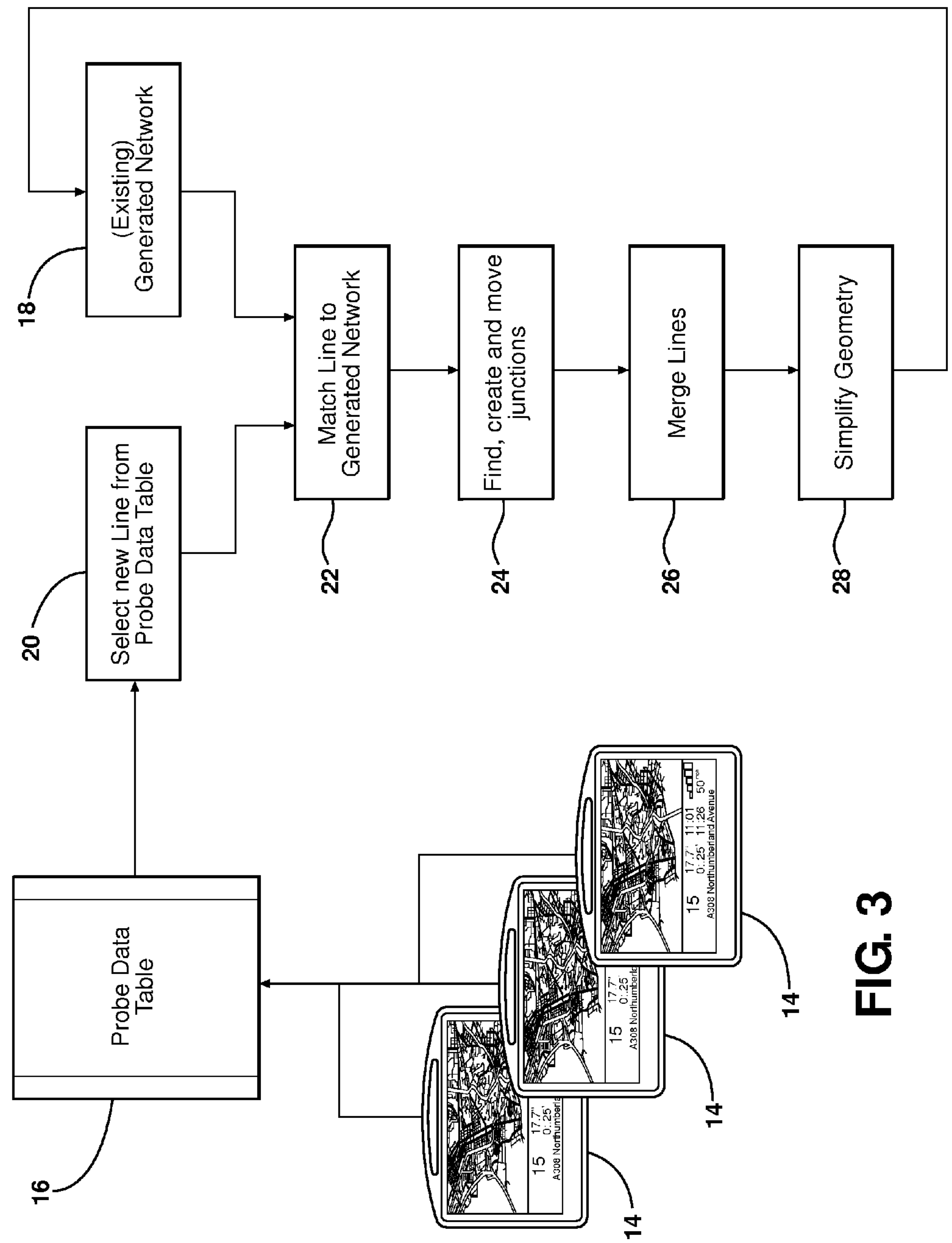
FIG. 3 is a schematic diagram depicting an overview of the subject method wherein probe data is collected from a plurality of GPS-enabled navigation devices, stored in a table, and then matched to line segments in a preexisting digital vector map for the purpose of improving and/or extending the digital vector map.

Referring to the figures, wherein like numerals indicate like or corresponding parts throughout the several views, the subject invention is described schematically in FIG. 3. Here, a plurality of probes 14 are depicted as GPS-enabled personal navigation devices such as those manufactured by TomTom NV (www.tomtom.com). However, any suitable device with GPS functionality may be used to generate probe data points, including handheld devices, mobile phones, PDAs, and the like. The probe data points are collected and stored in a probe data table 16 or other suitable database or repository. The existing digital vector map, in this example a previously created digital map, is contained in a table 18. Of course, the digital vector map 18 can exist as a database or in other suitable form. Trace lines are generated from the rough probe data in table 16 as an initial step. A new line is selected from the probe data table at step 20. The selected line is matched to the digital vector map at step 22. During this step, each point of the trace line will be associated with a network element using a map matching method as described in greater detail below. If the matching method is not able to associate any network element to the trace line, the probe data point is marked as "unmatched." All other probe data points are attempted to be matched to the existing network in this manner For trace line segments whose data points are not matched to any element of the existing network, these must be split from the network elements and inserted, i.e., connected, via a new or existing junction. This occurs in step 24. In some cases, it is reasonable to use a known or preexisting junction. Junctions may be referred to as intersections in a roadway network application. Sometimes, an existing junction will not be in the correct location, and it will be moved as necessary. In some instances, new junctions will need to be created, according to the techniques described below.

Once the matching and junction steps 22, 24 have been completed, the trace line segments are merged with the associated network elements at step 26. This is described in greater detail below, in which merge algorithms and methodology are utilized. Finally, to reduce the number of shape points, it is possible to simplify the network element before updating the network table at step 18. This optional simplification step is indicated at function block 28 and can be accomplished through various techniques, including by application of the well-known Douglas-Peucker algorithm.

Figure 4:
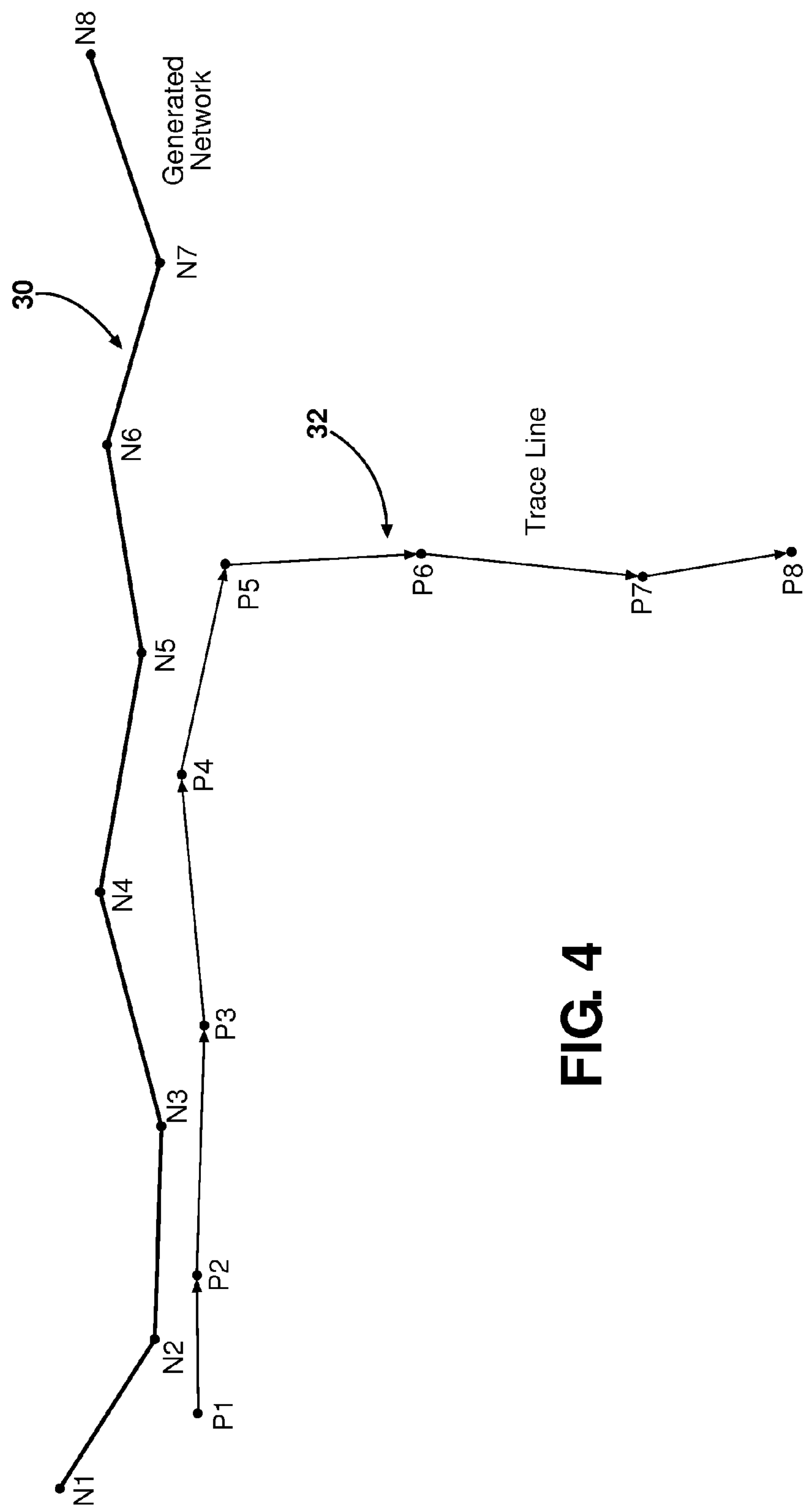
FIG. 4 is an illustration of the manner in which a trace line resulting from probe data points is initially set in a coordinate system along side the preexisting elements in a digital vector map.

Turning now to FIG. 4, a simplified representation of a digital vector map is generally indicated at 30. The digital vector map 30 may represent a digital map of a roadway or walking path or the like. The digital vector map 30 is represented by a plurality of line segments connected end-to-end by common nodes labeled N1, N2, N3 . . . N8. Thus, the digital vector map 30 exists in this example as a digital map so that each of the line segments is associated within the coordinate system of the map by geo-coded information, as is well known. Here also in FIG. 4 exists a trace line, generally indicated at 32. The trace line 32 is generated by a plurality of probe data points P1, P2, P3 . . . P8 which were generated by radio signal or other wireless technology from a probe 14 like that described above in connection with FIG. 3. Directionality is represented by the vectors interconnecting data points P1-P8 on the trace line 32. The method of this invention is directed toward improving the digital vector map 30 by determining which portions of the trace line 32 should be matched with the digital vector map 30, which portions of the trace line 32 represent extended (i.e., new) map data which was not previously contained in the digital vector map 30, and where specifically a junction point should be established between the extended portion of the trace line 32 and the digital vector map 30.

Figure 5:
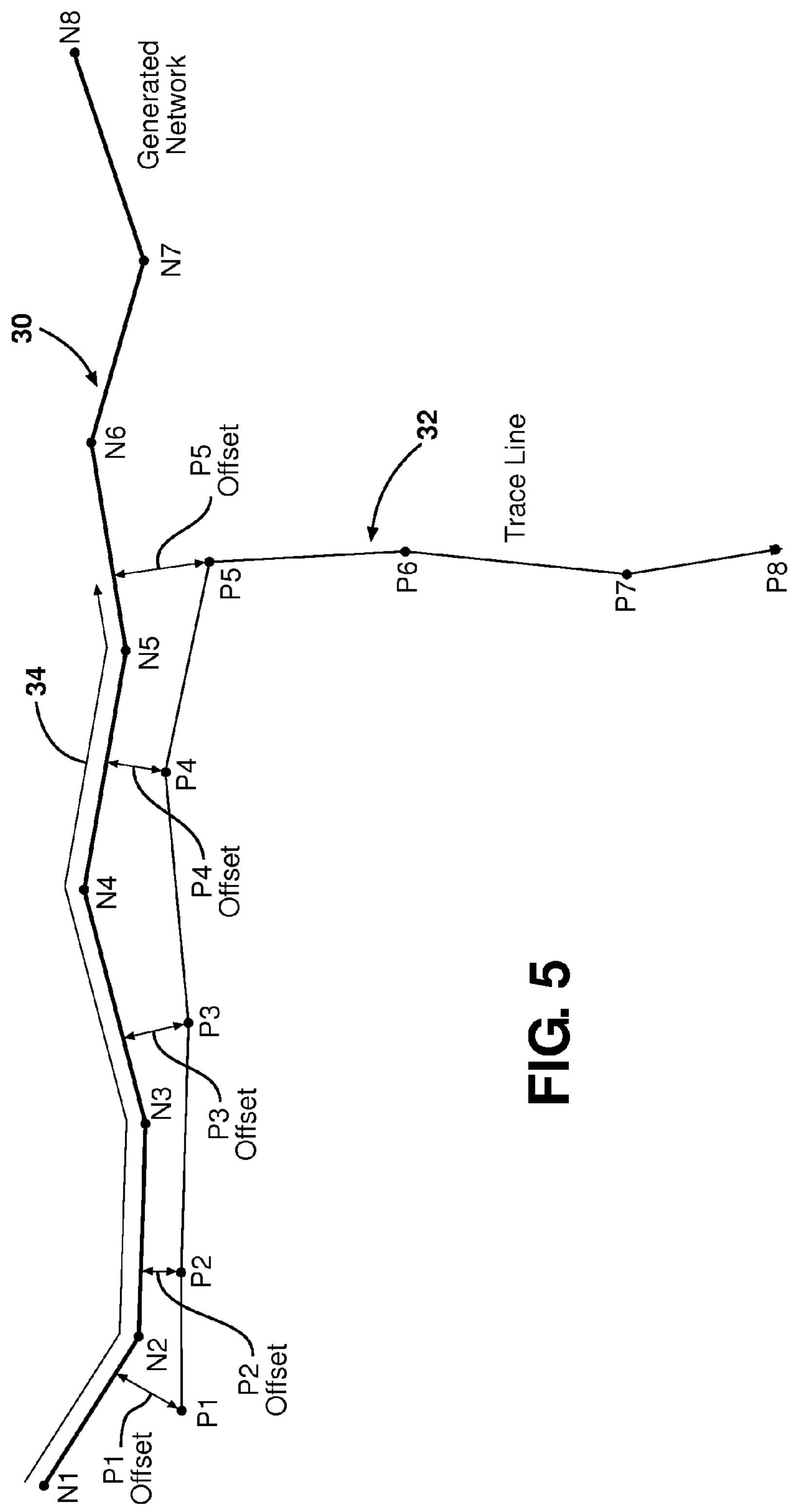
FIG. 5 is a view as in FIG. 4, but depicting the calculation of measures and offset distances between line segments in the digital vector map and the collected data points.

Referring now to FIG. 5, the digital vector map 30 and trace line 32 are illustrated, together with assigned values of offset and measure. The offset is defined as the shortest distance from a probe data point on the trace line 32 to the digital vector map 30. The offsets for data points P1, P2, P3, P4 and P5 of the trace line 32 are depicted with double-ended arrows in FIG. 5. The measure is the length from the first point of the network element(node N1 in the digital vector map 30) to the orthogonal projection of the trace point to the network element 30. In other words, the measure is the length along the line segments of the digital vector map 30 up to the point at which the offset measure of a particular probe data point is taken. In FIG. 5, dimension line 34 represents the measure for data point P5 in the trace line 32. Because the projected point, i.e., the point at which the offset measurement is taken along a line segment of the digital vector map 30, is in general not unique, the measure is also in general not unique. In this case, it may even be necessary to choose one of several projected points. To match a point Pf Of a trace line p to a network element w, the following conditions must be observed:

a. The offset of pl to w must be smaller than a predetermined maximum offset value.
b. There are at least n connected points $p_k, \ldots, p_{k+n-1}$ ($k \le i < k+n$) which have an offset to w smaller than the predetermined maximum offset value, and where n is a fixed number greater than or equal to 2.
c. For the measures $m(p_j, w)$, $m(p_l, w)$ of the points $p_j$ and $p_l$ to the network element w, $m(p_j, w) \le m(p_l, w)$ if $k \le j < l < k+n$.

Thus, it is possible that more than one element in the digital vector map 30 fulfills these conditions. For example, the digital vector map 30 may contain digital vector map elements which are very close together, and for which a data point in the trace line 32 is near to both. In order to match the trace line 32 to the digital map, a strategy is needed to discern the better network element to match the trace line 32. As one strategy example, the network element with the smallest offset of the first point in a sequence of the connected points which fulfill the conditions may be used. In a case of bidirectional map matching, it may then be necessary to modify condition (c.) above.

For the data points P1, P2, P3, P4 and P5 of the trace line 32, these are matched to the line segments. However, the data points P6, P7 and P8 are not matched because the offset of these points is larger than the predetermined maximum offset value. The predetermined maximum offset value can be selected according to any conditions or specifications established beforehand. Various techniques may be employed to choose the best network element in any given situation. One possible strategy may be to implement a kind of hysteresis effect. Another possibility is to use the direction, i.e., heading, to the adjacent previous trace point. Using the latter directional strategy it is possible to set n=1. Of course, it is possible to use both strategies (hysteresis and heading) together.

Through the map matching techniques described above, the trace line 32 may be divided into several segments or branches which have the same matched network element (data points P1-P5) or which are unmatched to any network element (data points P6-P8). Contrarywise, the matched network element 30 is divided into one segment which is matched to the trace line 32 until two segments which are not matched to the trace line 32. The objective is to merge the matched segments of the trace line 32 with the associated portions of the line segments. Or said another way, the objective is to replace or relocate the network element 30 through a computed centre-line as described in detail below. Therefore, it is necessary to determine the location where the line segments in the digital vector map 30 should be split so as to propagate therefrom a new or extended portion of the network as represented by trace line data points P6-P8. At this point, a new junction will be inserted.

Figure 8:
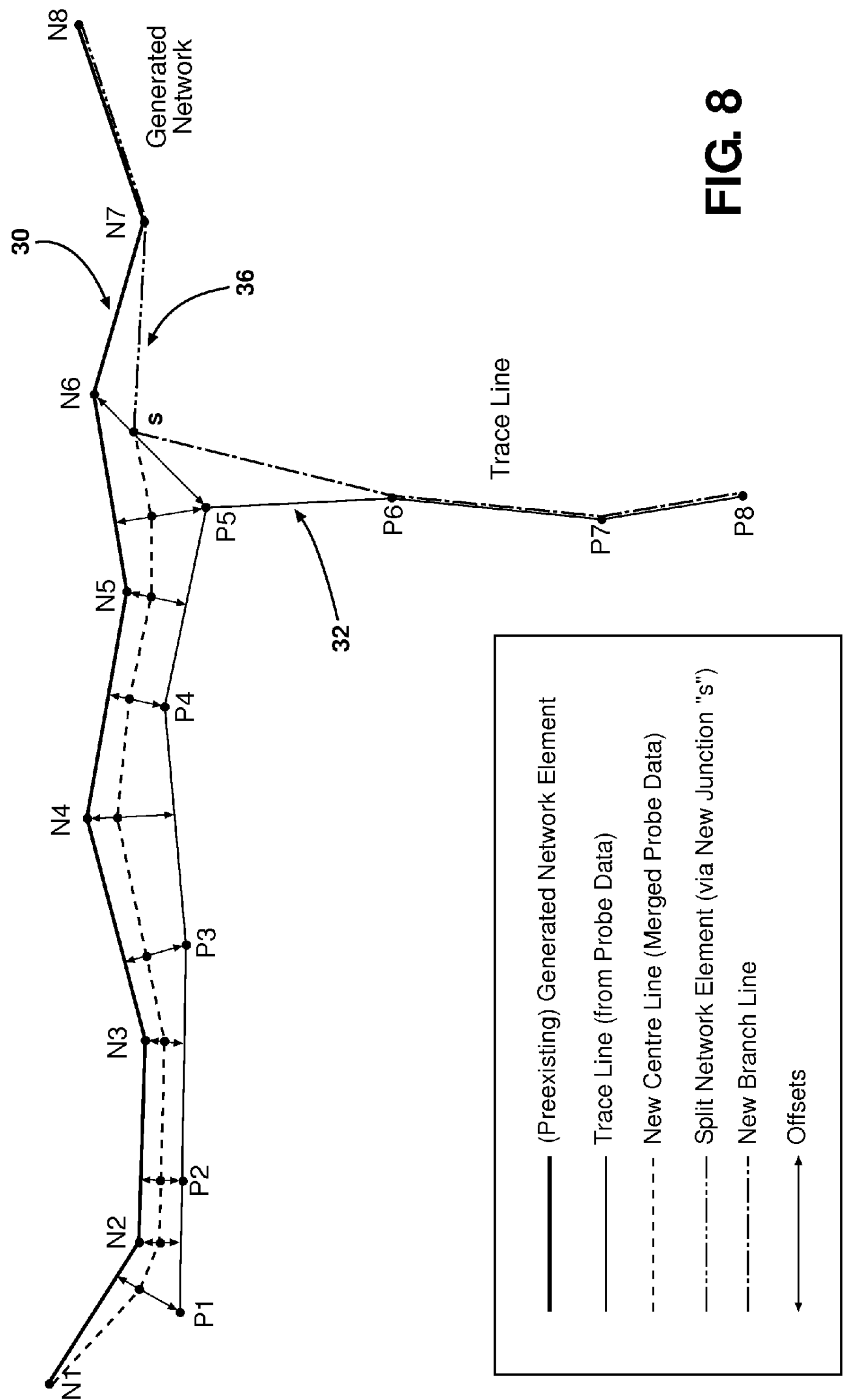
FIG. 8 depicts an updated digital vector map using the techniques of this invention.

There are various methods or techniques to determine the split point or junction. One simple technique to find the junction node is to use the last point of the trace line 32 which is matched to the network element 30. In the example of FIGS. 7 and 8, probe data point P5 along the trace line 32 is the last point of the trace line 32 which is matched to the network element 30. This point is projected to the closest point on the network element 30, which projection coincides with the offset distance measurement. Junction point "r" is calculated as the weighted mean between the projected point lying along the network element 30 and the probe data point P5. Weights are set for both the trace line 32 and the line segment(s) in the digital vector map 30.

A weight can be set also for junctions J of the line segments w, i.e., for junctions N1 and N8 of the network element 30 Assigning junctions J a weight more easily allows the algorithm to compute or move junctions J. However this is an optional feature as exemplified in the current version of the subject algorithm where no particular weights are associated to the junctions. In cases where junction weight is desired, the weight of the junctions can computed from the weight of the adjacent line segments w, or alternatively from a separate weight assignment technique. Moreover, it is possible to use a finer segmentation of the weight of a line segment w. In such circumstances, it may be helpful to associate different parts of a line segment w with different weights. For example, one could associate the weight to the individual shape points SP in the line segment w. Another possibility to associate a weight to parts of a line segment w is to associate to each line segment w a list of weight values together with a measure range. Of course, many other variations are also possible. For simplicity, the weight of the trace line 32 may be set at one. The weight of the network element 30 may be established in various ways, but is here set as the number of previous traces from which the digital vector map element 30 was created. In these examples, it is assumed that the digital vector map 30 was created from two prior trace line events. As a result, the weight for the digital vector map 30 is two in this example. If, for example, the digital vector map 30 were the result of 15 or 20 or 25 prior trace lines, then the weight of the digital vector map 30 would be set at 15 or 20 or 25. The mean at which the split point r is established may be calculated as shown in FIG. 7, wherein the letter x represents the line weight for the digital vector map 30. In this example, wherein the line weight of the digital vector map 30 equals 2, point r is spaced one-third (i.e., 1/(2+1)) of the offset distance from the digital vector map 30. In other words, probe data point P5 is the last point of the trace line 32 matched to the network element 30, and a weighted mean calculation places the new junction point or node r a distance of ⅓ from the original network element 30.

Referring still to FIG. 5, the point r may be a good choice for a junction point, i.e., the point at which the unmatched data points P6, P7 and P8 of the trace line 32 intersect the digital vector map 30. However, the technique described above for identifying the junction point r may not be suitable in all situations or for all types of applications. An alternative technique is to search for the point along the digital vector map 30 with the highest measure and with an offset to the last-matched point along the trace line (point P5 in our example) smaller than the predetermined maximum offset value. If the measure of this point is larger than the measure of the projected point (i.e., point at which the offset measure touches the digital vector map 30), then it may be preferable to use this larger point (N6) to compute the split point or junction point. In FIG. 6, this is network data point P6 rather than data point N5 if it is assumed that the offset of point N6 relative to P5 is still smaller than the predetermined maximum offset value. In this case, the new junction point "s" can be computed in the same way as a weighted mean of the point and its projection to the trace line 32. This is illustrated in FIG. 6 by reference to the point s as a new junction. Therefore, depending upon the predetermined maximum offset value, different split points or junction points may be calculated.

Practically speaking, however, it may be necessary to consider many different cases. For example, there may be a contrary succession of the points, or there may be an end of the trace line 32 or of the network element 30. Sometimes, it is possible to use a preexisting junction which is near the computed one. Computing the correct junction point will have a significant influence on the digital vector map 30 as it is updated. Those of skill will understand that many variations can be implemented in connection with the creation, modification or selection of junction points. It may be advisable under some circumstances to insert additional probe data points in the critical areas of the trace line 32 and/or the network element 30. Alternatively, junction points can be computed without reliance upon the probe data points whatsoever using purely mathematical calculations or subjective standards or by referring to supplemental reference data.

Once the junction point has been identified, it is necessary to formally split the digital vector map element 30. This may be accomplished by adopting the presumed junction points as an actual node in the line segment, as illustrated in FIG. 8. In FIG. 8, the unmatched part of the digital vector map 30 consists of its data points P6, P7 and P8. The digital vector map 30 is thus split at its new junction point s. The unmatched part of the trace line 32 is then easily supplemented to the network. It is necessary only to connect the network element 30 from point N7 to the new junction points.

Before completing the update operation, line segment 30 is replaced or relocated to a computed centre-line. I.e., the trace line 32 is merged with the digital vector map 30 by creating a centre-line between the matched part of the trace line 32 and the digital vector map element 30. To compute the new centre-line, each matched data point of the trace line 32 (i.e., data points P1, P2, P3, P4 and P5) are projected to the digital vector map element 30 using the offset distance methodology described above. For each such offset distance, the weighted mean is computed between the two points after the manner described above in connection with FIG. 7. Again, the weight of the trace line 32 may be set to 1, whereas the weight of the digital vector map element 30 is the number of prior traces from which it was created. Therefore, the merger of point P5 results in the new data point r, which becomes a node for the centre-line. To obtain further data points and thereby enhance accuracy of the network data, matched points from the digital vector map 30 (i.e., N2, N3, N4 and N5) are matched to the trace line 32 using similar orthogonal projection as shown in FIG. 8. The weighted mean is computed for these offsets as well, as represented by the node points placed along the respective offsets.

All of these newly computed mean points are connected as line segments which together comprise the centre-line. The weight of the computed centre-line is now the sum of the weights of the prior digital vector map 30 and trace line 32 or the continuing example 3. Thus, the next time probe data points are matched to the updated digital vector map, which will now be represented by broken lines 36, the line weight will be 3. After this step, the updated network element 36 then replaces the previous digital vector map 30 in the table 18 with its node points and computed weight. Therefore, with each matched trace line 32, the updated network element line 36 contains more and more data points or nodes. Thus, it may be helpful to remove some of these points through simplifying the geometry. For that purpose, the Douglas-Peucker algorithm may be used, which is well documented.

Those of skill in this field may envision various improvements and extensions of this technology. For example, with these techniques, it is foreseeable to incorporate the computation of several road attributes like average speed, road classification, altitude and slope values. Computing of the altitude, for example, can be understood simply as an additional attribute to an ordinary two-dimensional map, or as an additional dimension. In the latter case, the whole map can be considered as a three-dimensional map. The whole network generation and refinement process can be applied on this three-dimensional map. When matching a three-dimensional trace to a three-dimensional map, a three-dimensional centre-line is computed and so on. Of course one has to assume that for all trace points and also for the pre-existing map altitude values are available. This is in the first case not necessary because it is possible to compute attributes also with incomplete data. Furthermore, confidence models can be developed for the generated geometry as well as the several attributes. Detection of turn behavior at crossings and branchings can also be implemented in connection with suitable data modeling to represent the turn behavior. Furthermore, stop signs and traffic lights can be inferred or detected. With a suitable extension of these techniques, a bidirectional network can be generated. By these techniques, network elements generated from old data can be kept up to date without overloading data storage or data processing resources.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention is defined only by the following claims.

What is claimed is:

1. A computer-implemented method for generating, refining and extending digital vector maps using GPS traces from probe data, comprising:

providing, by a processor, a digital vector map having a plurality of nodes spatially associated within a coordinate system, each node having at least one line segment extending therefrom;

associating, by the processor, each line segment in the digital vector map with a weight value, wherein the weighting of each line segment is based on a number of previous probe traces associated with each line segment;

collecting, by the processor, at least one GPS trace from a plurality of sequentially transmitted probe data points;

establishing, by the processor, a map matching criteria;

comparing, by the processor, each probe data point along the GPS trace to at least one line segment in the digital vector map using the map matching criteria;

designating, by the processor, as "matched" each probe data point along the GPS trace that meets the map matching criteria while designating as "unmatched" each probe data point along the GPS trace that fails the map matching criteria;

associating, by the processor, the portion of the GPS trace containing matched probe data points to the respective line segment(s) of the digital vector map;

computing, by the processor, a centre-line between the respective line segment and the portion of the GPS trace containing matched probe data points using the weight value of the line segment;

replacing, by the processor, the line segment through the centre-line; and creating, by the processor, a new line segment in the digital vector map with the portion of the GPS trace containing unmatched probe data points;

the method further comprising the steps of:

determining, by the processor, a split point based on the last matched probe data point and a projected point on the line segment of the digital vector map by projecting a last matching probe point to a closet point on a respective line segment associated with the last matching probe point;

splitting, by the processor, the digital vector map by providing a new node at this point; and connecting, by the processor, the new node with the next node in the digital vector map.

2. The method of claim 1 further including simplifying the updated digital vector map.

3. The method of claim 1 wherein said step of simplifying the updated digital vector map includes applying the Douglas-Peucker algorithm.

4. The method of claim 1 wherein the digital vector map is a unidirectional network.

5. The method of claim 1 wherein the digital vector map is a bidirectional network.

6. The method of claim 1 further comprising computing attributes of the updated digital vector map.

7. The method of claim 6, wherein said step of computing attributes includes computing a road class of the line segments.

8. The method of claim 1 further including removing line segments from the digital vector map which have a weight value below a predetermined threshold value in a post-processing operation.

9. The method of claim 1, wherein the designation is based on a calculated offset distance between each probe data point and the respective line segment.

10. The method of claim 1 further comprising providing the digital vector map to one or more navigation system to assist in at least one navigation service.

11. The method of claim 2, wherein the projection uses a calculated weighted mean.

12. A non-transitory computer-readable medium which stores a set of instructions which when executed performs a method for generation, refining and extending digital vector maps using GPS traces from probe data, the method executed by the set of instructions comprising:

providing a digital vector map having a plurality of nodes spatially associated within a coordinate system, each node having at least one line segment extending therefrom;

associating each line segment in the digital vector map with a weight value, wherein the weighting of each line segment is based on a number of previous probe trace associated with each line segment;

collecting at least one GPS trace from a plurality of sequentially transmitted probe data points;

establishing a map matching criteria;

comparing each probe data point along the GPS trace to at least one line segment in the digital vector map matching criteria;

designating as "matched" each probe data point along the GPS trace that meets the map matching criteria while designating as "unmatched" each probe data point along the GPS trace that fails the map matching criteria;

associating the portion of the GPS trace containing matched probe data points to the respective line segment(s) of the digital vector map;

computing a centre-line between the respective line segment and the portion of the GPS trace containing matched probe data points using the weight value of the line segment;

replacing the line segment through the centre-line; and creating a new line segment in the digital vector map with the portion of the GPS trace containing unmatched probe data points;

the method further comprising the steps of:

determining a split point based on the last matched probe data point and a projected point on the line segment of the digital vector map by projecting a last matching probe point to a closet point on a respective line segment associated with the last matching probe point;

splitting the digital vector map by providing a new node at this point; and connecting the new node with the next node in the digital vector map.

13. The computer-readable medium of claim 12 further comprising providing the digital vector map to one or more navigation systems to assist in at least one navigation service.

14. The computer-readable medium of claim 12, wherein the projection uses a calculated weighted mean.

15. A non-transitory computer-readable medium which stores a set of instructions which when executed performs a method for generating, refining and extending digital vector maps using GPS traces from probe data, the method executed by the set of instructions comprising:

providing a digital vector map having a plurality of nodes spatially associated within a coordinate system, each node having at least one line segment extending therefrom;

associating each line segment in the digital vector map with a weight value, wherein the weighting of each line segment is based on a number of previous probe traces associated with each line segment;

collecting at least one GPS trace from a plurality of sequentially transmitted probe data points;

establishing a map matching criteria;

comparing each probe data point along the GPS trace to at least one line segment in the digital vector map using the map matching criteria;

designating as "matched" each probe data point along the GPS trace that meets the map matching criteria while designating as "unmatched" each probe data point along the GPS trace that fails the map matching criteria;

associating the portion of the GPS trace containing matched probe data points to the respective line segment(s) of the digital vector map;

computing a centre-line between the respective line segment and the portion of the GPS trace containing matched probe data points using the weight value of the line segment;

replacing the line segment through the centre-line; and creating a new line segment in the digital vector map with the portion of the GPS trace containing unmatched probe data points;

determining a split point based on the last matched probe data point and a projected point on the line segment of the digital vector map by projecting a last matching probe point to a closest point on a respective line segment associated with the last matching probe point;

splitting the digital vector map by providing a new node at this point; and connecting the new node with the next node in the digital vector map.

* * * * *